US012629840B2

(12) United States Patent　(10) Patent No.:　US 12,629,840 B2
Chaki et al.　(45) Date of Patent:　May 19, 2026

(54) OPERATION CONTROL DEVICE, OPERATION CONTROL SYSTEM, OPERATION CONTROL METHOD, AND STORAGE MEDIUM

(71) Applicant: HONDA MOTOR CO., LTD., Tokyo (JP)

(72) Inventors: Tomohiro Chaki, Wako (JP); Akira Mizutani, Wako (JP); Tomohiro Kawakami, Wako (JP); Takeshi Chiku, Wako (JP); Tomomi Fukui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 75 days.

(21) Appl. No.: 18/608,971

(22) Filed: Mar. 19, 2024

(65) Prior Publication Data

US 2024/0316780 A1　Sep. 26, 2024

(30) Foreign Application Priority Data

Mar. 24, 2023　(JP) ................................ 2023-048107

(51) Int. Cl.
*B25J 9/16*　(2006.01)
*B25J 11/00*　(2006.01)

(52) U.S. Cl.
CPC ........... *B25J 9/1692* (2013.01); *B25J 9/1682* (2013.01); *B25J 11/0045* (2013.01)

(58) Field of Classification Search
CPC .... B25J 9/1692; B25J 9/1682; B25J 11/0045; B25J 9/1643

(Continued)

(56) References Cited

U.S. PATENT DOCUMENTS 5,336,982 A * 8/1994 Backes ................... B25J 9/1682
318/568.22
8,260,463 B2 * 9/2012 Nakamoto ............. B25J 13/085
700/259

(Continued)

FOREIGN PATENT DOCUMENTS

WO　2018/212226　11/2018

OTHER PUBLICATIONS

Lyu, Zihang, Ken'ichi Koyanagi, Katsuki Nagahara, Hiroyuki Masuta, Fengyu Li, Ahmed Almassri, Takuya Tsukagoshi, Kentaro Noda, and Toru Oshima. Sep. 2023. "Framework to Estimate Operating Intention for a Leader-Follower Robot" Machines 11, No. 9: 918. https://doi.org/10.3390/machines11090918 (Year: 2023).*

(Continued)

*Primary Examiner* — Wade Miles
*Assistant Examiner* — Sidney Leigh Molnar
(74) *Attorney, Agent, or Firm* — Amin, Turocy & Watson, LLP

(57)　ABSTRACT

An operation control device that controls an operation of a robot having a plurality of arms and end effectors connected to each of the arms includes an acquisition unit configured to acquire an operation instruction including a target position of the end effector from an operator, a relative relationship maintenance instruction unit configured to issue an instruction to keep a relative relationship between the end effectors constant, a control command generation unit configured to correct a target position of the end effector to maintain a relative relationship between the end effectors in response to the operation instruction acquired according to an instruction from the relative relationship maintenance instruction unit, and to calculate a joint angle target of the arm based on the corrected target position of the end effector.

7 Claims, 6 Drawing Sheets

(58) Field of Classification Search
USPC ................. 700/245–264; 318/568.11–568.25
See application file for complete search history.

(56) References Cited

U.S. PATENT DOCUMENTS

| | | | | |
|---|---|---|---|---|
| 2006/0142896 | A1* | 6/2006 | Yokoyama | B25J 9/1612 |
| | | | | 700/245 |
| 2009/0287354 | A1* | 11/2009 | Choi | B25J 9/1682 |
| | | | | 901/30 |
| 2015/0251316 | A1* | 9/2015 | Smith | B25J 9/1625 |
| | | | | 901/46 |
| 2018/0330200 | A1* | 11/2018 | Shibata | G06F 18/241 |
| 2019/0307519 | A1* | 10/2019 | Popovic | B25J 9/1682 |
| 2020/0078955 | A1 | 3/2020 | Fernando | |
| 2020/0246980 | A1* | 8/2020 | Kuppuswamy | B25J 15/0033 |
| 2021/0053219 | A1* | 2/2021 | Nishimura | B25J 9/1633 |
| 2024/0198526 | A1* | 6/2024 | Aparicio Ojea | B25J 9/1669 |

OTHER PUBLICATIONS

Achim Buerkle, William Eaton, Niels Lohse, Thomas Bamber, Pedro Ferreira, EEG based arm movement intention recognition towards enhanced safety in symbiotic Human-Robot Collaboration, Robotics and Computer-Integrated Manufacturing, vol. 70, 2021, 102137, ISSN 0736-5845. (Year: 2021).*

Anna Belardinelli, Alhub, Estimating manipulation intentions to ease teleoperation, Dec. 6, 2022, Robohub, https:// robohub.org/estimating-manipulation-intentions-to-ease-teleoperation/#:~:text= Such%20an%20intention%20estimation%20model,robot%20shared% 2Dcontrol%20object%20manipulation. (Year: 2022).*

Y. Wang, D. Wang, S. Yang and M. Shan, "A Practical Leader-Follower Tracking Control Scheme for Multiple Nonholonomic Mobile Robots in Unknown Obstacle Environments," in IEEE Transactions on Control Systems Technology, vol. 27, No. 4, pp. 1685-1693, Jul. 2019, doi: 10.1109/TCST.2018.2825943. (Year: 2019).*

Nakamura et al., "Cooperative Carrying Task Control based on Receding Horizon Control for Mobile Robots", International Journal of Circuits, Systems and Signal Processing, Issue 3, vol. 4, 2010, pp. 129-136. (Year: 2010).*

Zhang et al., "A Unified Quadratic-Programming-Based Dynamical System Approach to Joint Torque Optimization of Physically Constrained Redundant Manipulators", IEEE Transactions on Systems, Man, and Cybernetics—Part B: Cybernetics, vol. 34, No. 5, Oct. 2004, pp. 2126-2132. (Year: 2004).*

Thomas Feix et al., "The GRASP Taxonomy of Human GraspTypes" IEEETransactions on Human-Machine Systems ( vol. 46, No. 1, Feb. 2016), IEEE, p. 66-77.

* cited by examiner

Figure 6:
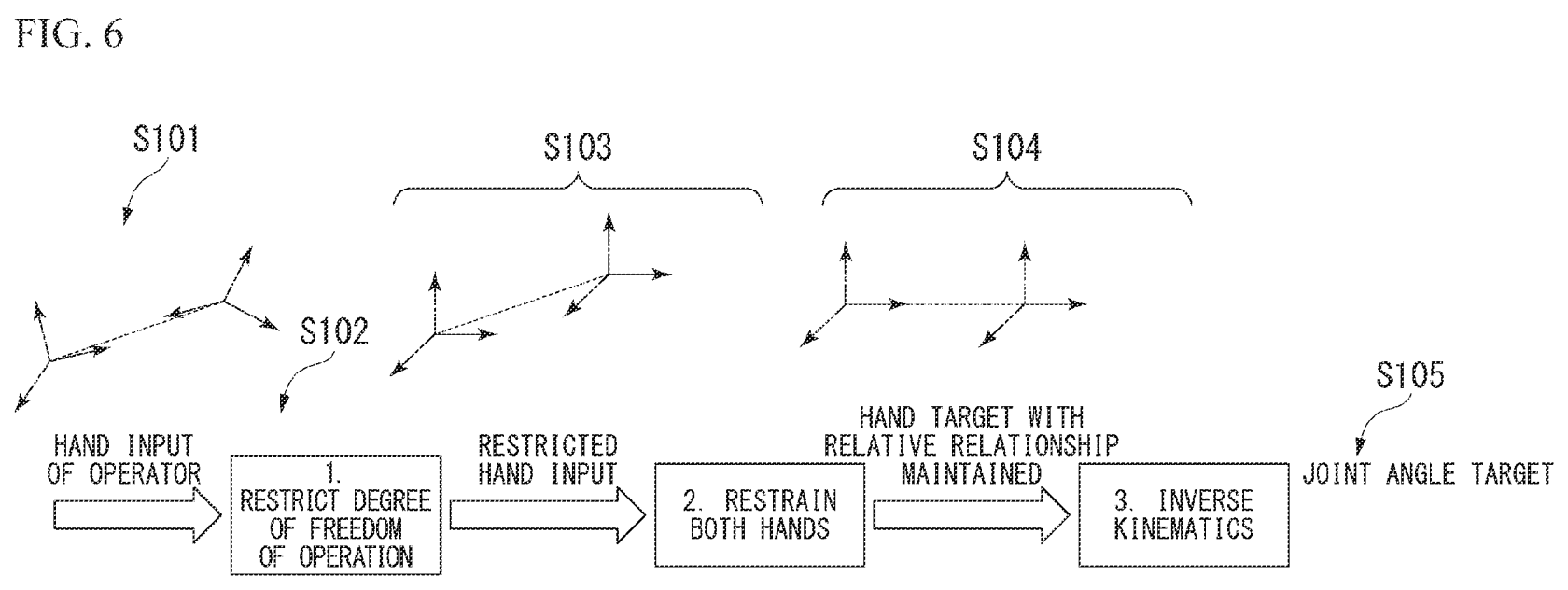

HAND INPUT OF OPERATOR

1. RESTRICT DEGREE OF FREEDOM OF OPERATION

S102

RESTRICTED HAND INPUT

S103

2. RESTRAIN BOTH HANDS

HAND TARGET WITH RELATIVE RELATIONSHIP MAINTAINED

S104

3. INVERSE KINEMATICS

S105

JOINT ANGLE TARGET

1

OPERATION CONTROL DEVICE, OPERATION CONTROL SYSTEM, OPERATION CONTROL METHOD, AND STORAGE MEDIUM

CROSS-REFERENCE TO RELATED APPLICATION

Priority is claimed on Japanese Patent Application No. 2023-048107, filed Mar. 24, 2023, the content of which is incorporated herein by reference.

BACKGROUND OF THE INVENTION

Field of the Invention

The present invention relates to an operation control device, an operation control system, an operation control method, and a storage medium.

Description of Related Art

A technology has been developed to remotely control a robot that performs work on an object to be operated (for example, refer to Patent Document 1 below). A task of such work is to cause a gripping unit of a robot to grasp an object to be worked on. In a typical remotely controlled robot, an operator directly commands a hand position of a multi-degree-of-freedom arm.

[Patent Document 1] PCT International Publication No. WO 2018/212226

SUMMARY OF THE INVENTION

However, the conventional technology is not sufficient for remotely controlled robots equipped with a plurality of multi-degree-of-freedom arms. For example, in double-arm work, it is important to maintain a relative relationship between both hands in addition to the object. In the conventional technology, this has inevitably increased the burden on an operator. Depending on an object, maintaining a relationship between both hands affects task accomplishment and performance. For this reason, the conventional technology has had a problem of increasing dependence on the skill of an operator.

Aspects of the present invention have been made in view of the problems described above, and an object thereof is to provide an operation control device, an operation control system, an operation control method, and a storage medium that can reduce a burden on an operator and reduce dependence on skill.

To solve the problems described above and achieve the related objectives, the present invention has adopted the following aspects.

(1) An operation control device according to one aspect of the present invention is an operation control device that controls an operation of a robot having a plurality of arms and an end effector connected to each of the arms, and includes an acquisition unit configured to acquire an operation instruction including a target position of the end effector from an operator, a relative relationship maintenance instruction unit configured to issue an instruction to keep a relative relationship between the end effectors constant, and a control command generation unit configured to correct a target position of the end effector to maintain a relative relationship between the end effectors in response to the operation instruction acquired according to an instruction from the relative relationship maintenance instruction unit, and to calculate a joint angle target of the arm based on the corrected target position of the end effector.

(2) In the aspect of (1) described above, the control command generation unit may add constraints in inverse kinematics when a joint angle target of the arm is calculated based on the corrected target position of the end effector.

(3) In the aspect of (1) or (2) described above, the control command generation unit may maintain a relative relationship between the end effectors by maintaining coordinate transformation that indicates the relative relationship of a second end effector connected to a second arm other than a first arm among the plurality of arms, viewed from the first end effector connected to the first arm among the plurality of arms, constant.

(4) In any one of the aspects of (1) to (3) described above, the control command generation unit may define, using a relative distance and posture between the end effectors, a target relative position and posture, and an allowable error from the target relative position and posture, a relationship between the relative position and posture to be maintained, which is a constraint for a relationship between both hands, determine a target joint angular acceleration or a speed of a target observation angle by solving inverse kinematics in an acceleration dimension, and generate a torque target value serving as a control command by solving the constraint on the relationship between both hands by putting a Jacobian and matrix calculation into a form of a quadratic programming problem.

(5) In any one of the aspects of (1) to (4) described above, the operation control device further includes an operation degree of freedom restriction unit configured to restrict a degree of freedom in which the operator can operate in response to the operation instruction, in which the control command generation unit may correct a target position of the end effector to maintain a relative relationship between the end effectors in response to the operation instruction whose degree of freedom is restricted according to an instruction from the relative relationship maintenance instruction unit.

(6) In any one of the aspects of (1) to (5) described above, the control command generation unit may estimate, using at least one of images captured by an imaging device installed in the operation instruction working environment, an operation intention of the operator, and issue an instruction to keep the relative relationship between the end effectors constant on the basis of the estimated operation intention.

(7) An operation control system according to another aspect of the present invention includes a plurality of arms, a robot including end effectors connected to each of the arms, and an operation control device configured to control an operation of the robot, in which the operation control device includes an acquisition unit configured to acquire an operation instruction including a target position of the end effector from an operator, a relative relationship maintenance instruction unit configured to issue an instruction to keep a relative relationship between the end effectors constant, and a control command generation unit configured to correct a target position of the end effector to maintain a relative relationship between the end effectors in response to the operation instruction acquired according to an instruction from the relative relationship maintenance instruction unit, and to calculate a joint angle target of the arm based on the corrected target position of the end effector.

(8) An operation control method according to still another aspect of the present invention is an operation control method in an operation control device that controls an operation of a robot including a plurality of arms and end effectors connected to each of the arms, and includes acquiring, by an acquisition unit, an operation instruction including a target position of the end effector from an operator, issuing, by a relative relationship maintenance instruction unit, an instruction to keep a relative relationship between the end effectors constant, and correcting, by a control command generation unit, a target position of the end effector to maintain a relative relationship between the end effectors in response to the operation instruction acquired according to an instruction to keep a relative relationship between the end effectors constant, and calculating a joint angle target of the arm based on the corrected target position of the end effector.

(9) A storage medium according to still another aspect of the present invention stores a program causing a computer of an operation control device that controls an operation of a robot including a plurality of arms and end effectors connected to each of the arms to execute acquiring, by an acquisition unit, an operation instruction including a target position of the end effector from an operator, issuing, by a relative relationship maintenance instruction unit, an instruction to keep a relative relationship between the end effectors constant, and correcting, by a control command generation unit, a target position of the end effector to maintain a relative relationship between the end effectors in response to the operation instruction acquired according to an instruction to keep a relative relationship between the end effectors constant, and calculating a joint angle target of the arm based on the corrected target position of the end effector.

According to the aspects (1) to (9) described above, a burden on the operator and dependence on skill can be reduced.

BRIEF DESCRIPTION OF THE DRAWINGS

FIG. 6 is a diagram for describing processing content and a procedure for restricting a degree of freedom of an operation in addition to restricting the relative relationship according to the second embodiment.

DETAILED DESCRIPTION OF THE INVENTION

Figure 1:
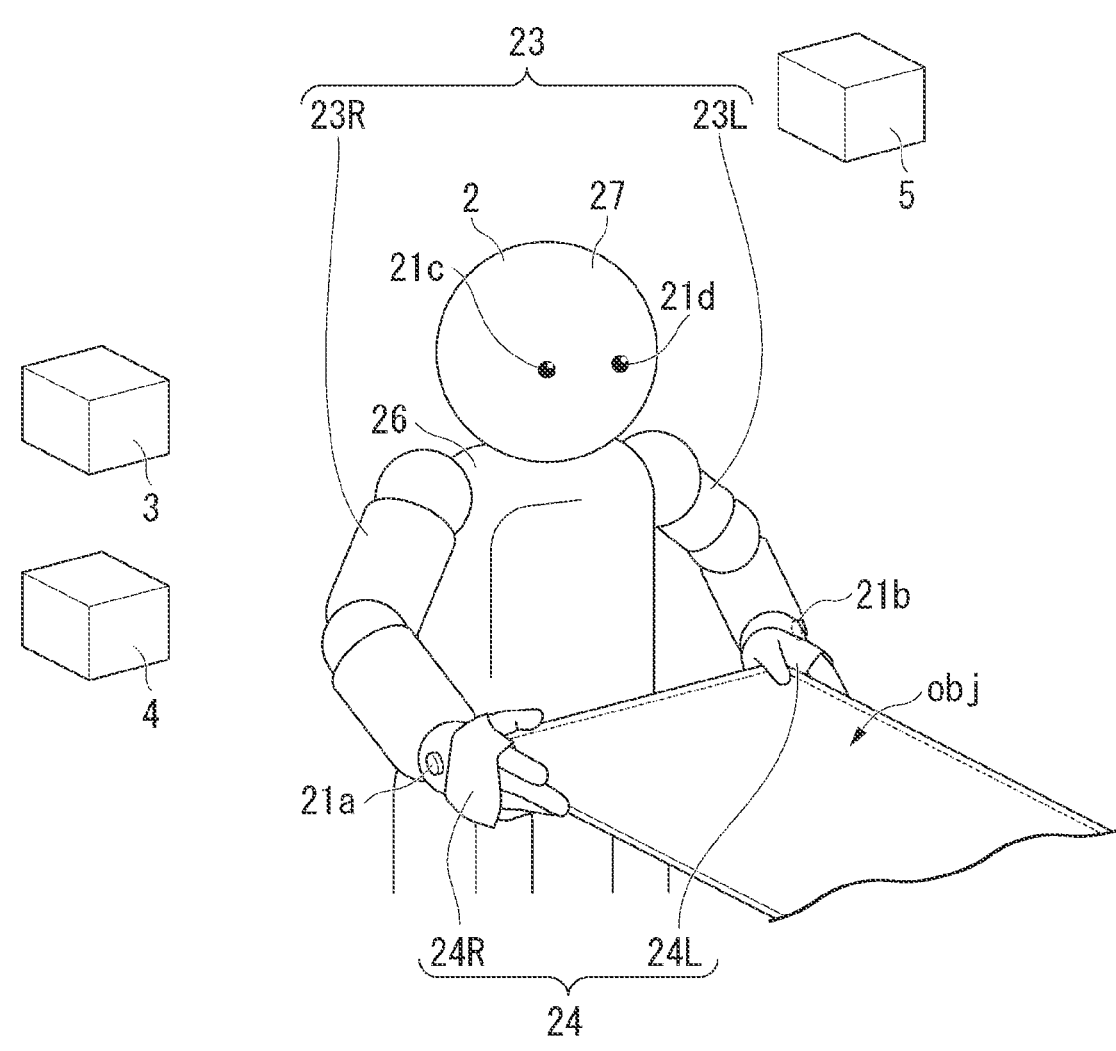
FIG. 1 is a diagram which shows a configuration example of a robot and an example of a working environment according to an embodiment.

Embodiments of the present invention will be described below with reference to the drawings. In the drawings used in the following description, a scale of each member is changed as appropriate to make each member a recognizable size.

In all the drawings for describing the embodiments, parts having the same functions are denoted by the same symbols, and repeated descriptions thereof will be omitted.

"On the basis of XX" as used herein means "on the basis of at least XX," and includes a case of being on the basis of another element in addition to XX. "On the basis of XX" is not limited to a case where XX is used directly, but also includes a case of being on the basis of XX on which calculations or processing is performed. "XX" is an arbitrary element (for example, arbitrary information).

(Outline)

In the present embodiment, one of the end effectors can be operated by an operator, and an operation control device restrains a control target (an input of inverse kinematics) of the hand position and posture of the other end effector. In the present embodiment, constraints are added in inverse kinematics so that a deviation of a relative relationship falls within an allowable range to deal with a case where the relative relationship is not maintained due to a difference in geometric characteristics between double arms, such as a reach range or self-interference of a robot arm.

In the following embodiment, an example will be described in which a robot is remotely controlled, but a method of the present embodiment can be applied even if the robot is autonomously controlled.

(Robot, Working Environment)

FIG. 1 is a diagram which shows a configuration example of a robot and an example of a working environment according to the present embodiment. The robot 2 includes, for example, an arm 23 (23R and 23L), an end effector 24 (24R and 24L), a body 26 (a base body), a head 27, and a sensor 21 (21a, 21b, 21c, and 21d) which is attached to the end effector 24 and the head 27. The end effector 24 includes at least two fingers. The sensor 21 is, for example, a camera that can also obtain depth information. The shape and configuration of the robot 2 shown in FIG. 1 are merely examples, and the present invention is not limited thereto. For example, there may be three or more arms.

The robot 2 is controlled by an operation control device 3 using operation information obtained from an operation input unit 4 operated by a worker and environment information obtained from an environment sensor 5. For example, as shown in FIG. 1, the robot 2 grips an object to be operated obj using both end effectors 24. The object to be operated obj is, for example, a belt-shaped member such as a sheet-shaped or plate-shaped member. The belt-shaped member is wound into, for example, a roll. The object to be operated obj may be any other object as long as it is an object gripped by both end effectors 24.

First Embodiment (Configuration of Operation Control System)

Next, a configuration example of an operation control system 1 will be described.

Figure 2:
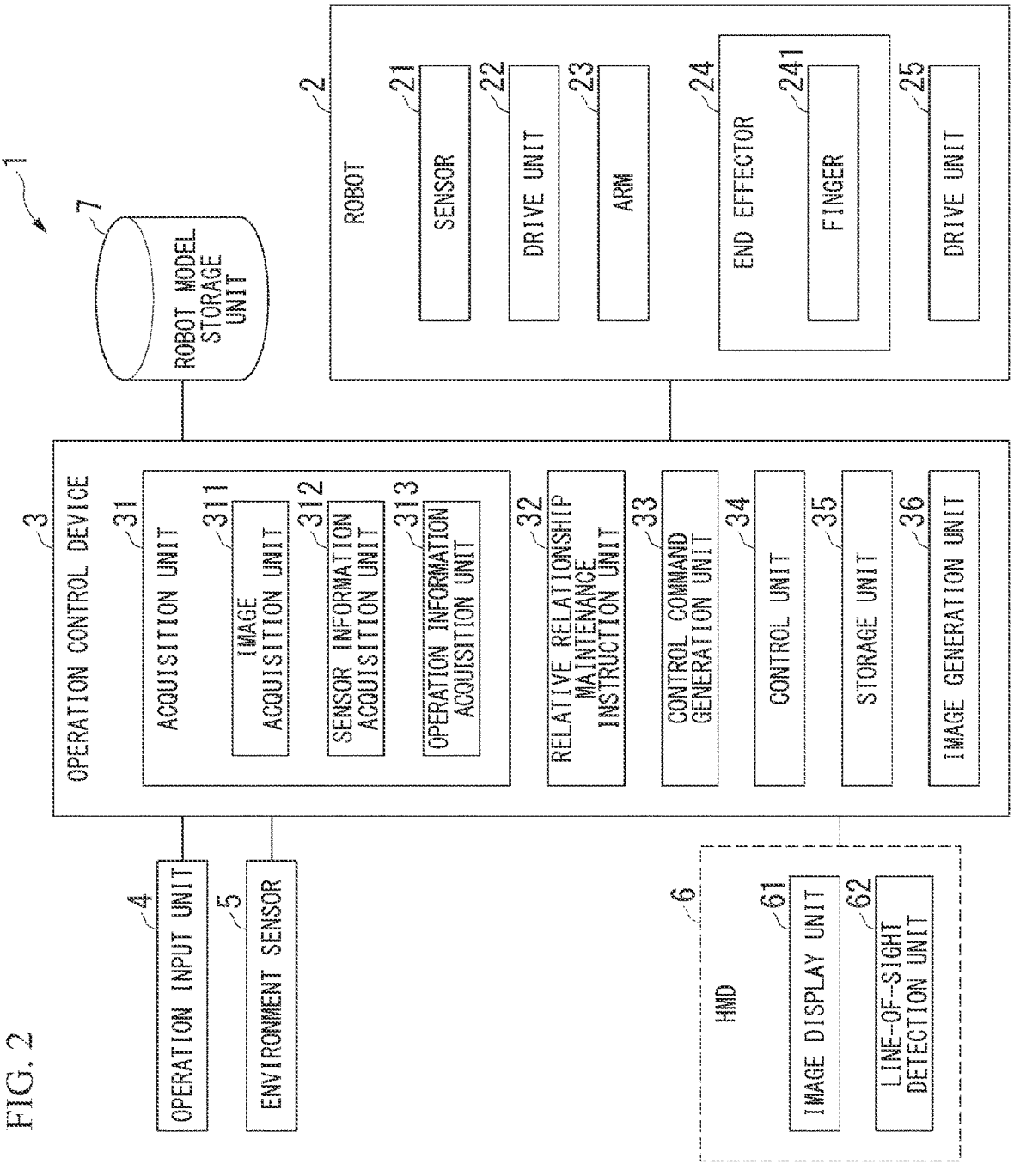
FIG. 2 is a diagram which shows a configuration example of an operation control system according to a first embodiment.

FIG. 2 is a diagram which shows a configuration example of the operation control system according to the present embodiment. The operation control system 1 includes, for example, a robot 2, an operation control device 3, an operation input unit 4, the environment sensor 5, an HMD 6, and a robot model storage unit 7.

The robot 2 includes, for example, a sensor 21, a drive unit 22, an arm 23, an end effector 24, a drive unit 25, a body 26 (FIG. 1), and a head 27 (FIG. 1).

The operation control device 3 includes, for example, an acquisition unit 31, a relative relationship maintenance instruction unit 32, a control command generation unit 33, a control unit 34, a storage unit 35, and an image generation unit 36.

The HMD 6 includes, for example, an image display unit 61 and a line-of-sight detection unit 62.

The operation input unit 4 is an input unit for the operator to input an operation instruction to the robot 2, and is, for example, a data glove, an operation switch, or the like. The operation input unit 4 and the operation control device 3 are connected wirelessly or by wire.

The environment sensor 5 is, for example, an RGB (red, green, and blue)D sensor that can also acquire depth information D. The environment sensor 5 may be, for example, a distance sensor. The environment sensor 5 and the operation control device 3 are connected wirelessly or by wire.

The HMD 6 is a head mounted display. The HMD 6 and the operation control device 3 are connected wirelessly or by wire. The HMD 6 includes, for example, an image display unit 61 and a line-of-sight detection unit 62.

The image display unit 61 displays an image acquired from the operation control device 3. The operator inputs an operation instruction using the operation input unit 4 while viewing an image presented on the image display unit 61. The image display unit 61 may be an image display device of a personal computer, an image display device such as a monitor, or the like.

The line-of-sight detection unit 62 detects a line-of-sight of the operator and outputs an operation instruction including information on the detected line-of-sight (an operator sensor value) to the operation control device 3.

A robot 2 will be described.

The robot 2 includes at least two arms 23, and the end effector 24 is connected to each arm.

The sensor 21 is, for example, an RGBD sensor, a 6-axis sensor, an acceleration sensor, a gyroscope sensor, a magnetic force sensor, or the like. When a plurality of sensors are provided, for example, two sensors may be used to track a movement of each finger. When the sensor 21 is an RGBD sensor, the sensor 21 is attached to, for example, the head 27, or a back of the hand or a wrist of the end effector 24. When the sensor 21 is a 6-axis sensor, the sensor 21 is attached to a tip of the finger 241, for example. A detection value detected by the sensor 21 may include a time stamp.

The drive unit 22 includes a drive circuit and an actuator. The drive unit 22 drives the arm 23. Actuators are attached to, for example, a shoulder joint and an elbow joint. The actuator includes an encoder and a torque sensor.

The arm 23 is connected to the body 26. In the arm 23, for example, a first link connects the shoulder joint and the elbow joint, and a second link connects the elbow joint and a wrist joint of the end effector 24.

The end effector 24 includes at least two fingers 241, such as a hand or a gripper.

The drive unit 25 includes a drive circuit and an actuator. The drive unit 25 drives the end effector 24. The actuators are attached to, for example, the wrist joint and finger joints.

The actuator is equipped with an encoder and a torque sensor.

An operation control device 3 will be described.

The acquisition unit 31 acquires information detected from the operation input unit 4, the environment sensor 5, and the line-of-sight detection unit 62 of the HMD 6, respectively. The acquisition unit 31 includes, for example, an image acquisition unit 311, a sensor information acquisition unit 312, and an operation information acquisition unit 313.

The image acquisition unit 311 acquires RGBD information from the environment sensor 5 and RGBD information from the sensor 21 of the robot 2.

The sensor information acquisition unit 312 acquires a sensor detection value from the environment sensor 5 and a sensor detection value from the sensor 21 of the robot 2.

The operation information acquisition unit 313 acquires an operation instruction from the operation input unit 4.

The relative relationship maintenance instruction unit 32 estimates the operation intention of the operator using information on an object to be operated obj such as the shape and size of the object to be operated and the acquired sensor detection value, and detects, as a result of the estimation, a timing or a period that keeps the relative relationship between both hands. Alternatively, the relative relationship maintenance instruction unit 32 may acquire an instruction from the worker regarding the timing or period for keeping the relative relationship between both hands constant. The relative relationship maintenance instruction unit 32 issues an instruction to keep the relative relationship between the end effectors 24 constant at the timing or period for keeping the estimated or acquired relative relationship between both hands constant. Keeping the relative relationship between both hands means keeping the relative relationship between both hands constant, but, for example, the inclination can be changed in a plane (xy plane) direction of the object to be operated.

The control command generation unit 33 uses the operation instruction acquired from the operator for the operation instructed by the relative relationship maintenance instruction unit 32, corrects a target position of the end effector 24 so as to maintain the relative relationship between the end effectors 24, and calculates a joint angle target of the arm 23 based on the corrected target position of the end effector 24.

The control unit 34 controls the drive unit 22 to control the operation of the arm 23 and controls the drive unit 25 to control an operation of the end effector 24 on the basis of a control command generated by the control command generation unit 33. The control unit 34 calculates a posture of the robot 2 at, for example, predetermined intervals using sensor information (including time stamps) and a three-dimensional shape model. The control unit 34 calculates the posture of the arm 23 and the end effector 24 according to work, and does not need to calculate the postures of the body 26, the head 27, and the like. The control unit 34 may estimate taxonomy information regarding the work (for example, refer to Reference 1) on the basis of information acquired by the operation information acquisition unit 313, and may also control the robot 2 using the estimated taxonomy information.

Reference 1: Thomas Feix, Javier Romero, et al., "The GRASP Taxonomy of Human Grasp Types" IEEE Transactions on Human-Machine Systems (Volume: 46, Issue: 1, February 2016), IEEE, p 66 to 77.

The storage unit 35 stores, for example, a program used by the control unit 34 for control, a threshold value, and the like. The storage unit 35 stores information on an object to be operated. The information on an object to be operated may be stored in advance, may be input by the operator, or may be, for example, determined and stored by measuring it with the environment sensor 5 or the like.

For example, the image generation unit 36 extracts an image of a working environment including the end effector 24 from an image captured by the environment sensor 5, or generates the captured image as an image to be provided to the HMD 6.

The robot model storage unit 7 stores a geometric structure, a dimension, and the like of the three-dimensional shape model of the robot 2, the arm 23, and the end effector 24.

(Relative Position Correction of Both Hands)

Figure 3:
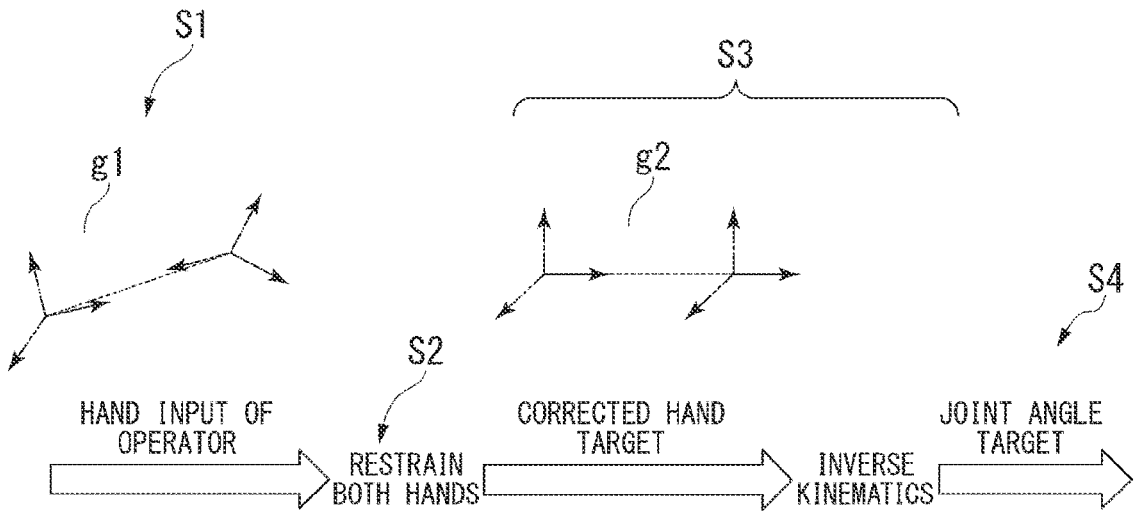
FIG. 3 is a diagram for describing content and a procedure of relative position correction processing for both hands according to the first embodiment.

Relative position correction for both hands will be described. FIG. 3 is a diagram for describing the relative position correction processing content and procedure of both hands according to the present embodiment.

(Step S1) The operation control device 3 acquires a hand instruction x for double arms, input by the operator.

(Step S2) The operation control device 3 corrects a hand target so as to maintain the relative relationship with the acquired hand instruction x using restraint conditions for both hands (restraint of both hands; a first stage correction). Through this processing, shapes of the left and right hands of the robot 2 are arranged into arbitrary shapes, such as from a symbol g1 to a symbol g2.

(Step S3) The operation control device 3 generates a joint angle target q for a hand target $x_{new}$ corrected in the first stage by solving a constraint equation with constraints, which will be described below in consideration of geometric constraints of the double arms (inverse kinematics; a second stage correction). A constraint condition is a restraint of the relative relationship between both hands. The joint angle target that is a result of the solution guarantees the corrected relationship between the both hands of the robot. The inverse kinematics, constraint conditions, and the like used in the second stage correction will be described below.

(Step S4) The operation control device 3 outputs the joint angle target q corrected in the second stage to the robot 2 and controls an operation of the robot 2.

In the example of the present embodiment, a plurality of end effectors 24 can be used simultaneously or individually according to an operation instruction of the operator.

In the present embodiment, by performing processing in step S2 and step S3, the plurality of end effectors 24 can be used simultaneously according to the operation instruction of the operator.

Moreover, in the present embodiment, by performing processing in step S2 without performing the processing in step S3, the plurality of end effectors 24 can be used individually according to the operation instruction of the operator. Alternatively, in the present embodiment, the plurality of end effectors 24 can be used individually according to the operation instruction of the operator by performing the processing in step S3 without performing the processing in step S2.

Even if the processing in step S2 is performed and the processing in step S3 is not performed, a burden on the operator and dependence on skill can be reduced.

When the processing in step S3 is performed without performing the processing in step S2, a target value having the relationship between both hands is created. In this processing, an achievable target value that has satisfied the relationship between both hands and hardware constraints is then generated in step S3. Therefore, even if correction is not performed in step S2 and the target value is not appropriate, the relationship between the both hands can be maintained as long as the constraints are imposed in step S3.

In other words, there is an image in which the processing in step S2 is protected by Want, and the processing in step S3 is protected by Must.

Figure 4:
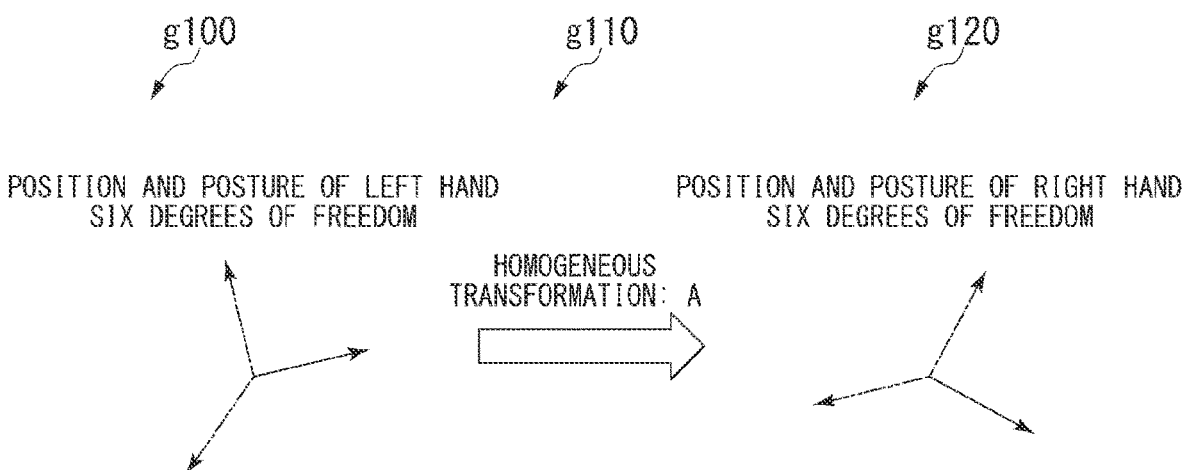
FIG. 4 is a diagram for describing the restraint of both hands.

FIG. 4 is a diagram for describing a restraint of both hands.

A symbol g100 is an example of the left hand position and posture, which has six degrees of freedom. A symbol g120 is an example of the right hand position and posture, which has six degrees of freedom. The six degrees of freedom include a degree of freedom in an X-axis direction, a degree of freedom in a Y-axis direction, a degree of freedom in a Z-axis direction, a rotational degree of freedom in the X-axis direction, a rotational degree of freedom in the Y-axis direction, and a rotational degree of freedom in the Z-axis direction.

For example, maintaining, that is, restraining the right hand (a symbol g110 in FIG. 4), so that the relative relationship (coordinate transformation) of the right hand as viewed from the left hand is constant (A is constant), is called "restraint of both hands" in the present embodiment.

In such a restraint of both hands, for example, when a worker is remotely controlling the robot 2 so that it performs work with both hands, the operation control device 3 first evaluates the position and posture of an approaching hand at each predetermined timing. As a result of the evaluation, when it is desired to maintain the position and posture of the hand, the operation control device 3 restrains the relative relationship between both hands so as to maintain the relationship between both hands at any timing. In this case, an object to be operated is previously indicated or known. The operation intention of the operator may be estimated by the relative relationship maintenance instruction unit 32 on the basis of, for example, operation input information and the object to be operated.

In the example described using FIG. 4, an example of restraining the right hand such that the relative relationship of the right hand as viewed from the left hand is constant has been described, but restraining the left hand may also be performed such that the relative relationship of the left hand as viewed from the right hand is constant.

(Intent Estimation)

The relative relationship maintenance instruction unit 32 estimates the operation intention of the operator using, for example, at least one of information on the line-of-sight of the operator and an operation instruction. The relative relationship maintenance instruction unit 32 may also perform intent estimation using a detection value of the environment sensor 5 or the like. The relative relationship maintenance instruction unit 32 estimates the operation intention of the operator using, for example, a GRASP Taxonomy method (refer to Reference 1, for example). The relative relationship maintenance instruction unit 32 classifies a state of the operator by classifying the posture of the operator or the robot 2, that is, the gripping posture, according to, for example, the grasp taxonomy method, and estimates the operation intention of the operator. The relative relationship maintenance instruction unit 32 inputs, for example, at least one of the information on the line-of-sight of the operator, the operation instruction, and the detected value of the environment sensor 5 into a learned model stored by the storage unit 35, and estimates the operation intention of the operator (for example, refer to Japanese Patent Application No. 2022-006498). The position and posture of each hand of the end effector 24 are detected by the control unit 34 using a detected value of an encoder of the sensor 21 attached to the arm 23 and the end effector 24. The control unit 34 may estimate the operation intention.

In this manner, in the present embodiment, it is assumed that the operator can operate one of the end effectors 24, and the system can restrain a control target of the hand position and posture (an input of inverse kinematics) of the other end effector 24.

In the present embodiment, to deal with a case where the relative relationship is not maintained due to a difference in the geometric characteristics between the double arms, such as the reach range or self-interference of the arm 23, constraints are added in inverse kinematics so that a deviation in the relative relationship falls within an allowable range. Inverse kinematics in this case refers to constrained mathematical optimization using quadratic programming, and a relative relationship is described as one of the constraint conditions.

As a result, according to the present embodiment, the burden on the operator can also be reduced.

Second Embodiment

In the present embodiment, restriction of a degree of freedom of operation, in addition to restraint of the relative relationship, is also performed.
(Configuration of Operation Control System)

A configuration example of an operation control system 1A will be described.

Figure 5:
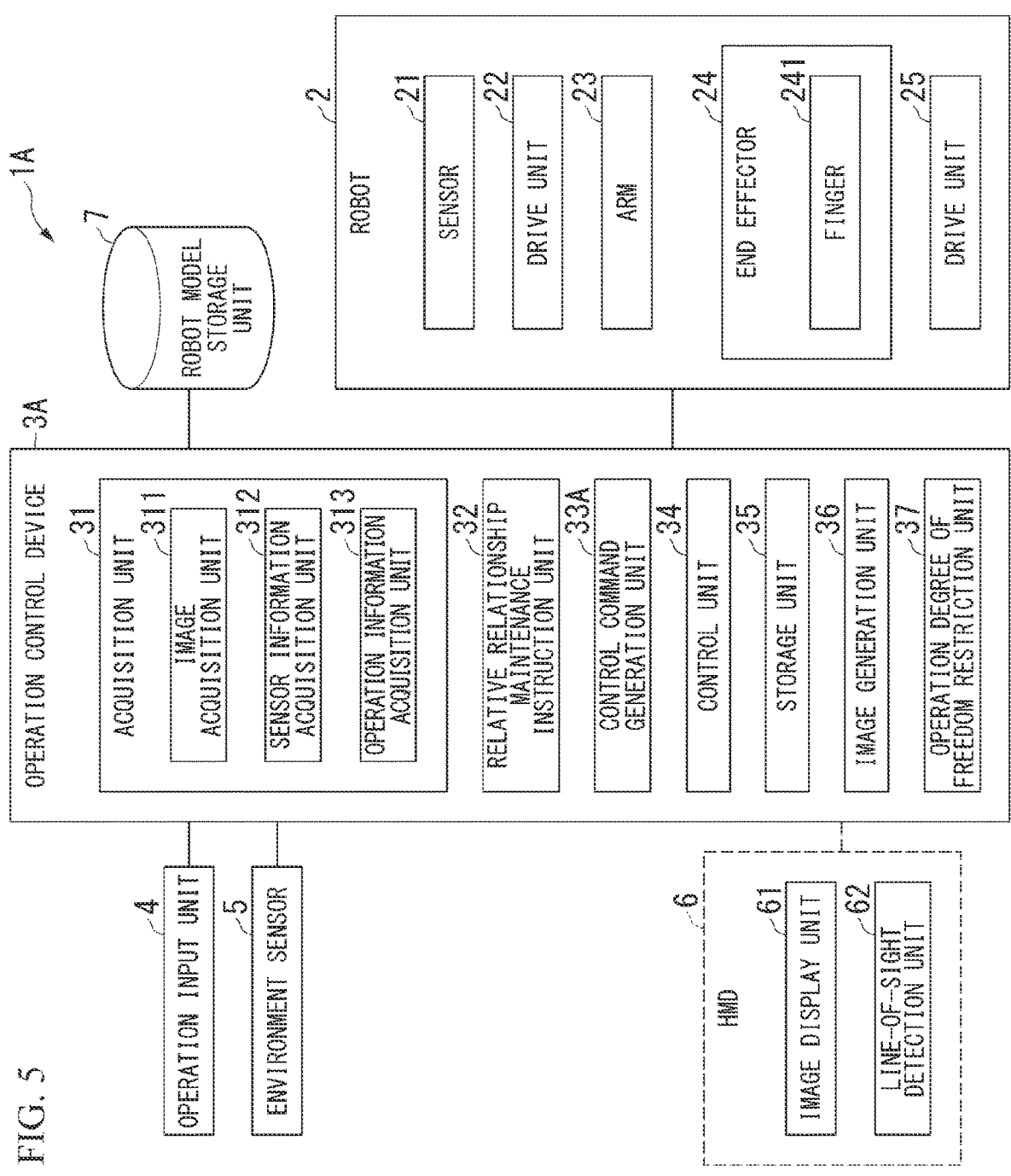
FIG. 5 is a diagram which shows a configuration example of an operation control system according to a second embodiment.

FIG. 5 is a diagram which shows a configuration example of the operation control system according to the present embodiment. The operation control system 1A includes, for example, a robot 2, an operation control device 3A, an operation input unit 4, an environment sensor 5, an HMD 6, and a robot model storage unit 7.

The robot 2 includes, for example, a sensor 21, a drive unit 22, an arm 23, an end effector 24, a drive unit 25, a body 26 (FIG. 1), and a head 27 (FIG. 1).

The operation control device 3A includes, for example, an acquisition unit 31, a relative relationship maintenance instruction unit 32, a control command generation unit 33A, a control unit 34, a storage unit 35, an image generation unit 36, and an operation degree of freedom restriction unit 37.

The HMD 6 includes, for example, an image display unit 61 and a line-of-sight detection unit 62.

The operation degree of freedom restriction unit 37 restricts a degree of freedom in which the operator can operate in response to the operation instruction of the operator.

The control command generation unit 33A corrects the operation instruction of an operator whose degree of freedom is restricted by the operation degree of freedom restriction unit 37 for an operation with an instruction from the relative relationship maintenance instruction unit 32, and a target position of an end effector so as to maintain a relative relationship between end effectors.

Next, examples of processing content and processing procedures will be described.

FIG. 6 is a diagram for describing processing content and procedure that not only restricts a relative relationship but also restricts a degree of freedom of an operation according to the present embodiment.

(Step S101) The operation control device 3A acquires the hand instruction x, input by the operator.

(Step S102) The operation control device 3A restricts the degrees of freedom in which the operator can operate with respect to the acquired hand instruction x (restriction of degree of freedom of operation).

(Step S103) The operation control device 3A corrects the hand target for a restricted hand input $x'_{new}$, like a symbol g330, to maintain the relative relationship between both hands (restraint of both hands; a first stage correction).

(Step S104) The operation control device 3A generates a joint angle target q for the hand target $x'_{new}$ (symbol g340) corrected in the first stage in consideration of the geometric constraints of the double arms (inverse kinematics; a second stage correction).

(Step S105) The operation control device 3A outputs the joint angle target q corrected in the second stage to the robot 2 and controls the operation of the robot 2.

Figure 7:
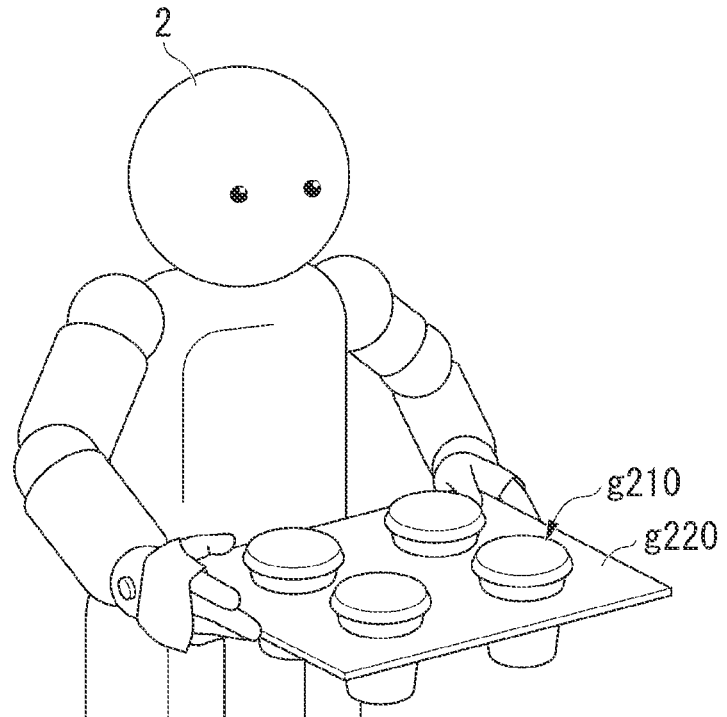
FIG. 7 is a diagram which shows an example of an operation in which a combination of operational freedom restriction, two-hand restraint, and inverse kinematics is effective.

FIG. 7 is a diagram which shows an example of an operation in which a combination of operation restriction of a degree of freedom, restraint of both hands, and inverse kinematics is effective. In the example of FIG. 7, the robot 2 is handing a tray g220 containing a cup g210 containing a drink to a person. In such an operation, the robot 2 needs to maintain the relationship between both hands while keeping the tray g220 horizontal. In an example of this operation, the operation degree of freedom restriction unit 37 performs restriction on the degree of freedom of an operation so as to "keep it horizontal." In such an example, control by the combination described above is effective.

If only the relative relationship between the hands is constrained, the hands can rotate (roll, pitch, yaw). If the operation shown in FIG. 7 is controlled under such constraint conditions, the tray g220 may tilt. On the other hand, for example, by allowing horizontal movement in the x and y directions and restricting the degree of freedom of rotation, it is possible to cause the tray g220 to perform an operation while it remains horizontal without tilting. That is, the operation control device 3A performs the restraint of both hands under the restriction of such degrees of freedom. The operation degree of freedom restriction unit 37 performs, for example, such restriction on the degree of freedom on the basis of the operation intention estimated by the control command generation unit 33A.

In this manner, in addition to the first embodiment, in the present embodiment, it is assumed that an operable hand position and a function of restricting the degree of freedom of a posture are combined.

As a result, according to the present embodiment, the burden on the operator can be further reduced.

In this manner, according to each of the embodiments described above, since the operation control device 3 (or 3A) guarantees that the relative relationship between both hands is maintained in a realizable range, the burden on the operator and dependence on skill can be reduced.
(Control Principle)

Inverse kinematics, which uses quadratic programming, is known to realize a plurality of targets such as a center of gravity position and a hand position of a robot using the constraint conditions. In the present embodiment, a target joint angular acceleration or a speed of a target observation angle is determined by solving inverse kinematics in an acceleration dimension, and generates a torque target value serving as a control command by solving the constraint on a relationship between both hands in the following equation (2) by putting, for example, a Jacobian and matrix calculation into a form of the quadratic programming problem in Equation (1). The following equation (1) shows a quadratic programming problem generalized as an n-dimensional vector. Acceleration is used to generate a torque command value from inverse dynamics. On the other hand, if there is no need to limit a torque or acceleration, a speed can also be used.

$$\underset{x}{\text{minimize}} \ \frac{1}{2} \ x^T Q x + c^T x \text{ subject to } A x \leq b \qquad (1)$$

In Equation (1), $x(\in R^n)$ is a variable vector and a joint angle target, $Q(\in R^{n \times n}$, n is a natural number, R is a real number) is a constant matrix, and $c(\in R^n)$ is a constant vector, where T represents transposition. Any constraints can be set as long as the joint angle target x is set to be the joint angular acceleration q" and can be put into a form of a coefficient matrix A and a vector b, which is a boundary condition that determines the constraint. In the present embodiment, the boundary condition is a restraint condition for both hands, such as allowing the relative relationship of the right hand as viewed from the left hand to be a1 in the x direction and the rotation to be a2.

In a double-arm robot arm, if it is assumed that a relative position and posture between hands are $d \in R^6$, a target relative position and posture is d*, and an allowable error from d* is Δd, a relationship between the relative position and posture to be maintained will be represented by the following Equation (2).

$$d^* - \Delta d < d < d^* + \Delta d \qquad (2)$$

By equation expansion, it is possible to maintain the relative relationship of a double-arm robot arms as the constraint conditions for inverse kinematics.

The method of the present embodiment is not limited to the robot 2 with double arms, but can also be applied to a robot with three or more multi-degree-of-freedom arms. In this case, a joint angle target is generated for multiple arms under the corrections and constraints described in the first embodiment or the corrections and constraints described in the second embodiment.

The method of the present embodiment is also applicable to combinations of various types of multi-degree-of-freedom arms with different geometric structures. In this case, when the shape or number of joints of the arm or end effector changes, the method described above can be used because the coefficient matrix A of Equation (1) contains Jacobian information including joint information.

In the method of the present embodiment, an allowable deviation can be set for every six degrees of freedom in inverse kinematics. As a result, with the method of the present embodiment, by intentionally increasing an allowable amount of a specific axis, it is possible to expect improved operability in a specific task.

In other words, since the relative relationship between both hands is included in the vector b in Equation (1), an error tolerance for each of the six degrees of freedom is a six-dimensional vector and each can be set arbitrarily. For example, when an allowable error in the x direction is tightened and an allowable error in the y direction is allowed to some extent, a width (tolerance) of the constraint can be set for each degree of freedom such that the allowable error in the x direction is set as, for example, 1 mm and the allowable error in the y direction is set as, for example, 10 mm. The operation control device 3 (or 3A) sets such an error tolerance on the basis of, for example, the estimated operation intention of a worker.

All or part of the processing performed by the operation control device 3 (or 3A) may also be performed by recording a program for realizing all or part of the functions of the operation control device 3 (or 3A) in the present invention on a computer-readable recording medium, and causing the computer system to read and execute the program recorded on the recording medium. A term "computer system" used herein includes an OS and hardware such as peripheral devices. The term "computer system" includes a WWW system equipped with a homepage providing environment (or a display environment). "Computer-readable recording medium" refers to a portable medium such as a flexible disk, a magneto-optical disc, an ROM, and a CD-ROM, and a storage device such as a hard disk built into the computer system. Furthermore, it is assumed that "computer-readable recording medium" includes those that hold a program for a certain period of time like a volatile memory (RAM) inside the computer system that serves as a server or client when a program is transmitted via a network such as the Internet or a communication line such as a telephone line.

The program described above may also be transmitted from a computer system that has stored this program stored in a storage device or the like to another computer system via a transmission medium or by a transmission wave in the transmission medium. Here, the "transmission medium" that transmits the program refers to a medium that has a function of transmitting information, such as a network (a communication network) such as the Internet or a communication line such as a telephone line. The program described above may be for realizing some of the functions described above. Furthermore, it may be a so-called difference file (a difference program) that can realize the functions described above in a combination with a program already recorded in the computer system.

Although a mode for implementing the present invention has been described above using embodiments, the present invention is not limited to these embodiments in any way, and various modifications and substitutions can be added within a range not departing from the gist of the present invention.

What is claimed is:

1. An operation control device that controls an operation of a robot having a plurality of arms and an end effector connected to each arm of the plurality of arms, comprising:

at least one processor; and at least one memory that stores executable instructions that, when executed by the at least one processor, facilitate performance of operations, comprising:

acquiring an operation instruction including a target position of an end effector of a plurality of end effectors from an operator;

issuing an instruction to maintain a relative relationship between the plurality of end effectors;

correcting a target position of the end effector to maintain a relative relationship between the plurality of end effectors in response to the operation instruction acquired according to the instruction;

calculating a joint angle target of an arm of the plurality of arms based on the corrected target position of the end effector; and generating a torque target value serving as a control command by solving inverse kinematics into a form of a quadratic programming problem expressed by a first equation, $$\underset{x}{\text{minimize}} \ \frac{1}{2} x^T Q x + c^T x$$

-continued subject to $Ax \leq b$ where, x ($\in R^n$) is a variable vector and the joint angle target, Q ($\in R^{n \times n}$, n is a natural number, R is a real number) is a constant matrix, and c ($\in R^n$) is a constant vector, where T represents transposition, the joint angle target x is set to be a joint angular acceleration q̈ or a joint angular velocity q̇, and a relationship between a relative position and posture between the plurality of end effectors to be maintained is represented by a second equation $$d * - \Delta d < d < d * + \Delta d$$

where, the relative position and posture between the plurality of end effectors is d$\in R^6$, a target relative position and posture between the plurality of end effectors is d*, and an allowable error from d* is $\Delta d$, wherein the second equation is expressed by a Jacobian matrix calculation into a form of Ax≤b where a coefficient matrix A and a vector b which is a boundary condition that determines a constraint.

2. The operation control device according to claim 1, wherein the end effector is a first end effector, and wherein the operations further comprise:

maintaining a relative relationship between the plurality of end effectors by maintaining a coordinate transformation that indicates a relative relationship of a second end effector of the plurality of end effectors connected to a second arm other than a first arm among the plurality of arms, viewed from the first end effector connected to the first arm among the plurality of arms, is constant.

3. The operation control device according to claim 1, wherein the operations further comprise:

restricting a degree of freedom in which the operator can operate in response to the operation instruction; and correcting a target position of the end effector to maintain a relative relationship between the plurality of end effectors in response to the operation instruction whose degree of freedom is restricted according to the instruction.

4. The operation control device according to claim 1, wherein the operations further comprise:

estimating, using at least one of a plurality of images captured by an imaging device installed in a working environment for the operation instruction, an operation intention of the operator; and issuing an instruction to keep the relative relationship between the plurality of end effectors constant on the basis of the estimated operation intention.

5. An operation control system comprising:

a plurality of arms, a robot including a plurality of end effectors respectively connected to each arm of the plurality of arms, and at least one processor; and at least one memory that stores executable instructions that, when executed by the at least one processor, facilitate performance of operations, comprising:

acquiring an operation instruction including a target position of an end effector of the plurality of end effectors from an operator;

issuing an instruction to keep a relative relationship between the plurality of end effectors constant;

correcting a target position of the end effector to maintain a relative relationship between the plurality of end effectors in response to the operation instruction acquired according to the instruction;

calculating a joint angle target of an arm of the plurality of arms based on the corrected target position of the end effector; and generating a torque target value serving as a control command by solving inverse kinematics into a form of a quadratic programming problem expressed by a first equation, $$\text{minimize}_x \ \frac{1}{2} x^T Q x + c^T x$$

subject to $Ax \leq b$ where, x ($\in R^n$) is a variable vector and the joint angle target, Q ($\in R^{n \times n}$, n is a natural number, R is a real number) is a constant matrix, and c ($\in R^n$) is a constant vector, where T represents transposition, the joint angle target x is set to be a joint angular acceleration q̈ or a joint angular velocity q̇, and a relationship between a relative position and posture between the plurality of end effectors to be maintained is represented by a second equation $$d * - \Delta d < d < d * + \Delta d$$

where, the relative position and posture between the plurality of end effectors is d$\in R^6$, a target relative position and posture between the plurality of end effectors is d*, and an allowable error from d* is $\Delta d$, wherein the second equation is expressed by a Jacobian matrix calculation into a form of Ax≤b where a coefficient matrix A and a vector b which is a boundary condition that determines a constraint.

6. An operation control method in an operation control device that controls an operation of a robot including a plurality of arms and a plurality of end effectors respectively connected to each arm of the plurality of arms comprising:

acquiring, by a device comprising at least one processor, an operation instruction including a target position of an end effector of the plurality of end effectors from an operator;

issuing, by the device, an instruction to keep a relative relationship between the plurality of end effectors constant;

correcting, by the device, a target position of the end effector to maintain a relative relationship between the plurality of end effectors in response to the operation instruction acquired according to the instruction to keep a relative relationship between the plurality of end effectors constant;

calculating, by the device, a joint angle target of an arm of the plurality of arms based on the corrected target position of the end effector; and generating a torque target value serving as a control command by solving inverse kinematics into a form of a quadratic programming problem expressed by a first equation, $$\text{minimize}_x \ \frac{1}{2}x^T Q x + c^T x$$

$$\text{subject to } Ax \leq b$$

where, x ($\in R^n$) is a variable vector and the joint angle target,

Q ($\in R^{n \times n}$, n is a natural number, R is a real number) is a constant matrix, and c ($\in R^n$) is a constant vector, where T represents transposition, the joint angle target x is set to be a joint angular acceleration q̈ or a joint angular velocity à, and a relationship between a relative position and posture between the plurality of end effectors to be maintained is represented by a second equation $$d* - \Delta d < d < d* + \Delta d$$

where, the relative position and posture between the plurality of end effectors is d$\in R^6$, a target relative position and posture between the plurality of end effectors is d*, and an allowable error from d* is $\Delta$d, wherein the second equation is expressed by a Jacobian matrix calculation into a form of Ax≤b where a coefficient matrix A and a vector b which is a boundary condition that determines a constraint.

7. A non-transitory machine-readable medium that, when executed by at least one processor, facilitates performance of operations of a robot including a plurality of arms and a plurality of end effectors respectively connected to each arm of the plurality of arms, the operations comprising:

acquiring an operation instruction including a target position of an end effector of the plurality of end effectors from an operator, issuing an instruction to keep a relative relationship between the plurality of end effectors constant, correcting a target position of the end effector to maintain a relative relationship between the plurality of end effectors in response to the operation instruction acquired according to the instruction to keep a relative relationship between the plurality of end effectors constant, calculating a joint angle target of an arm of the plurality of arms based on the corrected target position of the end effector, and generating a torque target value serving as a control command by solving inverse kinematics into a form of a quadratic programming problem expressed by a first equation, $$\text{minimize}_x \ \frac{1}{2}x^T Q x + c^T x$$

$$\text{subject to } Ax \leq b$$

where, x ($\in R^n$) is a variable vector and the joint angle target,

Q ($\in R^{n \times n}$, n is a natural number, R is a real number) is a constant matrix, and c ($\in R^n$) is a constant vector, where T represents transposition, the joint angle target x is set to be a joint angular acceleration q̈ or a joint angular velocity à, and a relationship between a relative position and posture between the plurality of end effectors to be maintained is represented by a second equation $$d* - \Delta d < d < d* + \Delta d$$

where, the relative position and posture between the plurality of end effectors is d$\in R^6$, a target relative position and posture between the plurality of end effectors is d*, and an allowable error from d* is $\Delta$d, wherein the second equation is expressed by a Jacobian matrix calculation into a form of Ax≤b where a coefficient matrix A and a vector b which is a boundary condition that determines a constraint.

\* \* \* \* \*